Patented June 10, 1924.

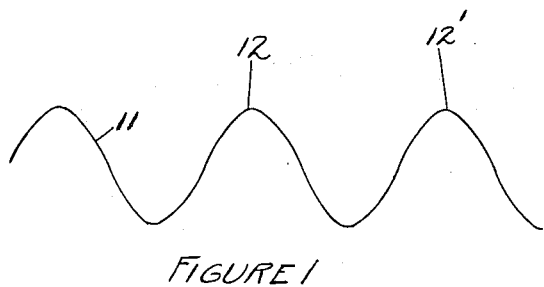
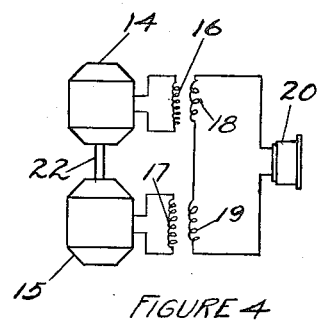
FIGURE 1
FIGURE 4
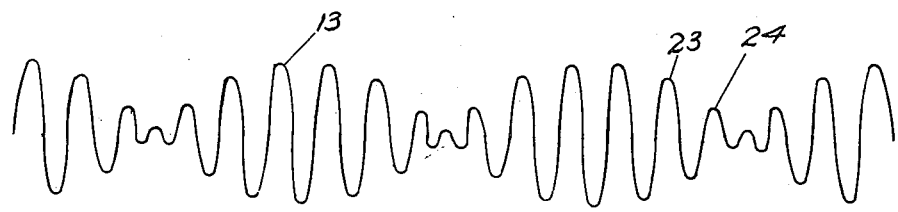
FIGURE 2
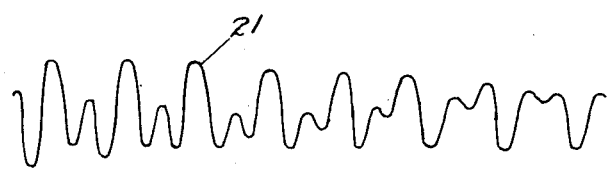
FIGURE 3

1,497,366

UNITED STATES PATENT OFFICE.

REGINALD A. FESSENDEN, OF CHESTNUT HILL, MASSACHUSETTS, ASSIGNOR TO SUB-MARINE SIGNAL COMPANY, OF PORTLAND, MAINE, A CORPORATION OF MAINE.

METHOD AND APPARATUS FOR SIGNALING.

Application filed August 3, 1920. Serial No. 401,030.

*To all whom it may concern:*

Be it known that I, REGINALD A. FESSENDEN, of Chestnut Hill, in the county of Middlesex and State of Massachusetts, a citizen of the United States, have invented new and useful Improvements in Methods and Apparatus for Signaling, of which the following is the specification.

My invention relates to signaling and more particularly to the identification of signals and still more particularly to the determination of the phase relation between different components of the same signal.

My invention has for its object increased efficiency in signaling and more especially increased efficiency, accuracy, and ease in determining the phase relation between different portions of the same signal.

Figures 1, 2 and 3 are illustrations of the compound waves herein referred to.

Fig. 4 is a diagrammatic view of apparatus for causing such signals, and

Figure 5:
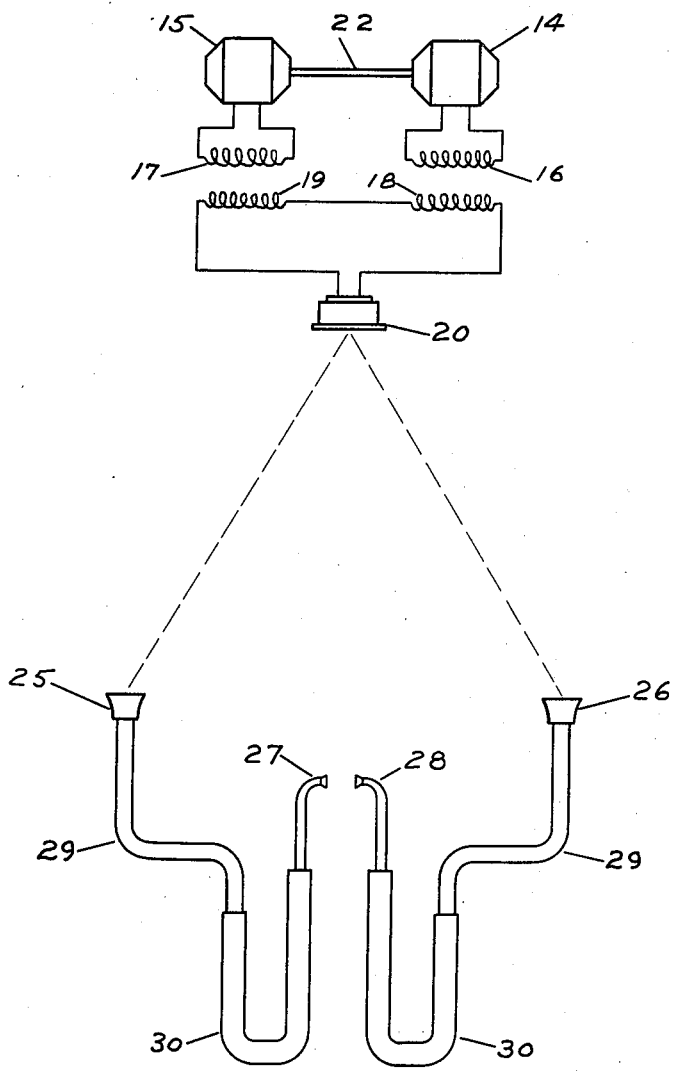
Fig. 5 shows diagrammatically one method of identifying such waves as may be originated by the apparatus of Fig. 4.

In signaling by radiant energy, such as Hertzian waves or sound transmitted through the air or through water, it is frequently desirable that various elements of the signal should be identified, more particularly, where it is desirable to measure the phase difference between the times of arrival of the same signal at different receivers, it is desirable that there should be no confusion between the different waves of the signal.

For example, in determining the direction of the source of an emitted sine wave signal, as shown by the curve 11, Fig. 1, where this is determined by measurement of difference of phase, it is very important that the time of arrival of the crest of a wave 12 on one receiver should not be confused with the time of arrival of the crest of another wave 12' on the other receiver, for if this happens the difference of times of arrival at one receiver and the other receiver will obviously be erroneous.

I overcome this difficulty by emitting a signal consisting of a predetermined arrangement of waves of different frequencies, such as shown, for example, at 13 in Fig. 2, which wave form is compounded of two slightly different frequencies.

This compound wave may be produced in any suitable manner; for example, two dynamos 14 and 15, one having a frequency of 1000 and the other a frequency of 800, may be mounted as shown on a common shaft 22 and excite the primaries of two transformers 16 and 17, whose secondaries 18 and 19 are in series with each other and with the signal-producing means, for example the oscillator 20.

It will be obvious on inspection of Fig. 2 that the crest of one wave 23 cannot well be confused with the crest of an adjacent wave 24 because the waves have different heights and shapes, and by making the frequencies close enough to each other the number of wave crests intervening between similar wave crests may be made as large as desired and consequently the risk of confusion minimized.

Other methods of producing compound waves will readily occur to those skilled in the art.

In Fig. 5 the method of signaling by the compound waves as shown in Fig. 2 is shown in detail. The waves are received in two receivers 25 and 26 which may be of any of the well known forms. The waves are then transmitted to the listening tubes 27 and 28, that, received by receiver 25 to the listening tube 27, and that wave received by the receiver 26 to the listening tube 28. When the waves, received at the respective receivers, arrive at their respective listening tubes, the character of the respective waves will prevent confusion between the different waves arriving at the respective tubes. By means of the compensating paths 30 which are of adjustable length, the waves which have the same characteristics may be brought in phase. If the waves were not distinctive in character from each other, there would be no way of knowing which two waves should be compensated to bring the waves in phase at the listening tubes. It may be noted further that the waves are identified by their characteristics before they are brought in phase, the bringing in phase serves as a check upon the identity of the same wave.

This method of compounding signal waves so as to assist identification I call "roughening the signal."

By matching impulses or waves is meant opposing them so as to give a minimum indication, or adding them to give a maximum indication, changing if necessary to do this, their phase in the manner well known in the art, for example, as shown in applicant's Patent No. 1,415,539.

What I claim is:

1. The method of signaling by periodic impulses which consists in generating at and transmitting from the sending station a plurality of signaling waves of different frequencies compounded in a predetermined manner to form a non-sinusoidal compound wave; receiving said non-sinusoidal wave at the receiving station on a plurality of receivers and matching similar portions of said compound wave as received on the two receivers with each other; whereby identification of corresponding points of the signaling impulse is facilitated.

2. The method of identifying the same parts of the same signal received upon individual receiving units, which consists in generating and transmitting a wave compounded of two nearly equal frequencies, whereby like parts of the wave occur periodically in a definite sequence, receiving said transmitted wave upon individual receivers, comparing said like parts of the wave received on the individual receivers whereby identification of said same parts is facilitated.

3. In the art of determining the direction of wave sources by comparing the phase difference at the time of arrival of the same signal at individual receivers, emitting a wave compounded of two different frequencies whereby like parts of the wave repeat periodically in a definite sequence receiving said wave at individual receivers, and matching said like parts of the wave whereby direction may be easily and accurately determined.

4. A method of eliminating the confusion of identifying similar vibrations of an emitting source, which consists in emitting from said source a signal comprising a plurality of waves of different frequencies, simultaneously, and measuring the difference in phase at the time of arrival of said signal at different receivers whereby confusion in identifying similar vibrations is eliminated.

REGINALD A. FESSENDEN.